United States Patent
Wang et al.

(10) Patent No.: US 12,123,378 B1
(45) Date of Patent: Oct. 22, 2024

(54) CYLINDER GAS RECIRCULATION SYSTEM DEVICE OF INTERNAL COMBUSTION ENGINE BASED ON PRESSURE DIFFERENTIAL DRIVING

(71) Applicant: Tianjin University, Tianjin (CN)

(72) Inventors: Tianyou Wang, Tianjin (CN); Tianlong Lu, Tianjin (CN); Zhen Lu, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/789,623

(22) Filed: Jul. 30, 2024

Related U.S. Application Data (63) Continuation of application No. PCT/CN2022/140120, filed on Dec. 19, 2022.

(51) Int. Cl.
*F02M 26/23* (2016.01)
*F02B 25/26* (2006.01)
*F02M 26/16* (2016.01)
*F02M 26/34* (2016.01)

(52) U.S. Cl.
CPC .......... *F02M 26/23* (2016.02); *F02M 26/16* (2016.02); *F02M 26/34* (2016.02); *F02B 25/26* (2013.01)

(58) Field of Classification Search
CPC .......... F02M 26/23; F02B 25/00; F02B 25/26
See application file for complete search history.

(56) References Cited

U.S. PATENT DOCUMENTS

| | | | |
|---|---|---|---|
| 8,495,992 B2 * | 7/2013 | Roth | F02D 13/0257 123/568.13 |
| 10,337,425 B2 * | 7/2019 | Boyer | F02M 26/05 |
| 10,982,616 B2 * | 4/2021 | Inoue | F02D 41/0065 |
| 2020/0386127 A1 | 12/2020 | Hakeem et al. | |

FOREIGN PATENT DOCUMENTS

| | | |
|---|---|---|
| CN | 101023250 A | 8/2007 |
| CN | 101319628 A | 12/2008 |
| CN | 101749147 A | 6/2010 |
| CN | 103423034 A | 12/2013 |
| CN | 104220713 A | 12/2014 |

(Continued)

OTHER PUBLICATIONS

Internation Search Report of PCT/CN2022/140120, Mailed Feb. 24, 2023.

*Primary Examiner* — Ngoc T Nguyen (57) ABSTRACT

A cylinder gas recirculation system device of an internal combustion engine based on pressure differential driving is provided, the overall device includes a recirculation intake and exhaust system and a gas storage system. An intake control valve on a cylinder block, a surge tank, and an exhaust control valve on the cylinder block are sequentially connected to form a gas recirculation subsystem of the cylinder block of the internal combustion engine. Two adjacent subsystems are in communication through an intake pipe. Positions of intake and exhaust pipelines may be anywhere between the top and bottom dead centers of a piston in a cylinder, and intake and exhaust valves of the gas recirculation may share the same valve. Different valves may also be used, and the intake and exhaust pipelines of the gas recirculation are arranged on the same side of the cylinder in double layers.

8 Claims, 5 Drawing Sheets

(56) References Cited

FOREIGN PATENT DOCUMENTS

| | | | |
|---|---|---|---|
| CN | 106762205 A | | 5/2017 |
| CN | 108798874 A | | 11/2018 |
| CN | 112664361 A | | 4/2021 |
| JP | 2007154877 A | | 6/2007 |
| JP | 2021088944 A | * | 6/2021 |

* cited by examiner

CYLINDER GAS RECIRCULATION SYSTEM DEVICE OF INTERNAL COMBUSTION ENGINE BASED ON PRESSURE DIFFERENTIAL DRIVING

CROSS-REFERENCE TO RELATED APPLICATIONS

This application is a continuation of PCT/CN2022/140120, filed on Dec. 19, 2022, and claims priority of Chinese Patent Application No. 202210275809.X, filed on Mar. 15, 2022, the entire contents of which are incorporated herein by reference.

TECHNICAL FIELD

The disclosure relates to the technical field of internal combustion engine structure, and in particular to a cylinder gas recirculation system device of an internal combustion engine based on pressure differential driving.

BACKGROUND

Marine low-speed engine is the core equipment of ocean-going vessels, which has become the main power source in the field of ocean-going transportation with its characteristics of large cylinder diameter, low speed, long stroke, and high pressurization. Since the 21st century, faced with the severe challenge of energy shortage and "double carbon" caused by the increasing shipping trade year by year, the development of efficient combustion technology for marine low-speed engines to improve thermal efficiency and reduce fuel consumption has become the key to ocean transportation. Taking a 10,000-box container ship as an example, every increase in fuel consumption of 1 g/kW·h means an additional 1.5 million RMB in fuel cost every year, so reducing fuel consumption is very important for improving the economy of marine engines. The swirl flow in the engine cylinder can improve the mixing effect of oil and gas in the cylinder, accelerate the combustion rate, and play a significant role in improving thermal efficiency and reducing fuel consumption. Based on the characteristics of the large combustion space of marine low-speed engines, the in-cylinder swirl flow has great potential for improvement. However, the remarkable improvement of in-cylinder swirl flow is limited by scavenging efficiency in the form of uniflow scavenging. Aiming at this problem, the present disclosure provides a device for realizing high-efficiency combustion under the condition of high swirl flow through the cylinder gas recirculation (CGR), which may improve engine power and reduce fuel consumption without additional power consumption.

SUMMARY

The present disclosure aims to provide a cylinder gas recirculation system device of an internal combustion engine based on pressure differential driving, which may realize high-efficiency combustion and greatly improve the oil-gas mixing and combustion performance in the cylinder.

The cylinder gas recirculation system device of the internal combustion engine based on pressure differential driving includes a cylinder block of the internal combustion engine, a cylinder, a CGR intake valve, a CGR exhaust valve, a CGR intake control valve, a CGR exhaust control valve, a CGR surge tank, an exhaust port, a turbine, a gas compressor, a scavenging box, a glow plug, a pressure sensor, and a gas outlet valve, etc.

The technical solution realized by the components in the device is as follows. The gas recirculation device includes two parts: a CGR passage system and a CGR gas storage system. The CGR intake valve, the CGR intake control valve, the CGR surge tank, the CGR exhaust control valve, and the CGR exhaust valve are sequentially connected to form a gas recirculation subsystem. The CGR intake control valve is in communication with the CGR surge tank to serve as an intake passage in the CGR passage system; the CGR surge tank is in communication with the CGR exhaust control valve to serve as an exhaust passage in the CGR passage system; two adjacent gas recirculation subsystems are in communication via a CGR intake pipe. An internal combustion engine with a four-cylinder structure includes four gas recirculation subsystems connected in pairs, an internal combustion engine with a six-cylinder structure includes six gas recirculation subsystems connected in pairs, and so on. The surge tank is provided with the glow plug, the pressure sensor, and the gas outlet valve to form the CGR gas storage system. The exhaust gas generated by the combustion process of the internal combustion engine enters the turbine via the exhaust port and is finally discharged into the atmosphere; fresh air firstly enters the gas compressor and enters the scavenging box after being cooled by a condenser, and then is delivered to the cylinder.

Figure 1:
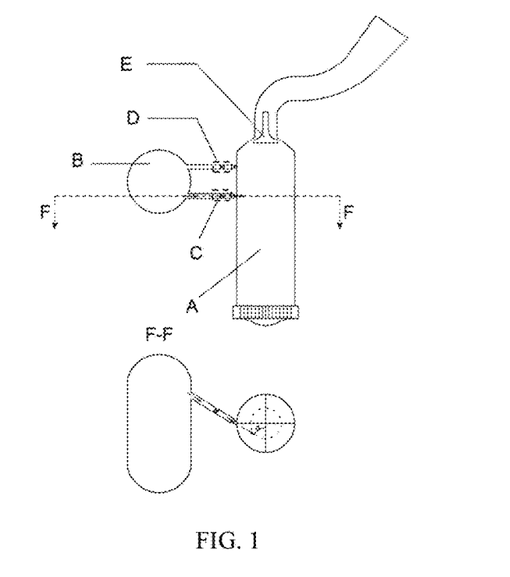
FIG. 1 is a schematic diagram of a cylinder gas recirculation system of an internal combustion engine of the present disclosure.

Use a relatively simple single-cylinder two-stroke engine to illustrate the principle of the present disclosure and CGR system. The displacement of the piston inside the internal combustion engine (caused by the crankshaft) and the combustion process in the cylinder cause changes in the pressure, and this pressure shows periodic changes with the crank angle. The principle of the present disclosure is that (as shown in FIG. 1): through the surge tank B (pressure of the gas in the surge tank is between the high-pressure gas pressure and low-pressure gas pressure in cylinder A), and through the opening and closing of the CGR intake valve D and the exhaust valve C, the flow between the high-pressure gas in the cylinder and gas in the surge tank, and the flow between the gas in the surge tank and the low-pressure gas in the cylinder are achieved. This may significantly increase the in-cylinder swirl ratio, achieving efficient and clean combustion. The cylinder gas recirculation mainly relies on two stages of intake and exhaust in the CGR system. The intake and exhaust of the gas recirculation device both refer to the surge tank.

During the CGR exhaust stage, after the exhaust valve E is closed, the pressure in the cylinder is still low, and since the pressure in the surge tank B is higher than the pressure in the cylinder A at this time, the CGR intake valve D is closed, and the gas in the surge tank may flow into the cylinder by opening the CGR exhaust valve. Since the ratio of the gas pressure in the cylinder to the pressure in the surge tank is equal to or less than the critical value (0.528), the gas in the surge tank would enter the cylinder along the wall surface of the cylinder at the local sound velocity. The recirculation gas enters the cylinder under the guidance of the wall surface of the cylinder, thereby effectively increasing the in-cylinder swirl ratio. Due to a higher gas flow rate, a large increase in the angular momentum of the gas in the cylinder can be achieved with a smaller amount of CGR gas.

Figure 2:
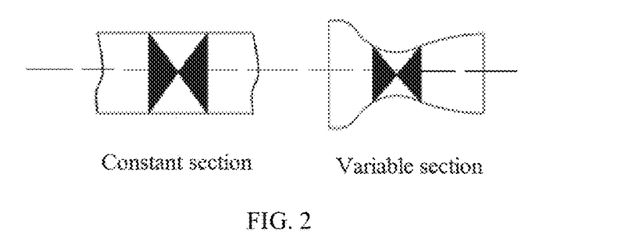
FIG. 2 is a partially enlarged view of a pipe at an exhaust valve.

The pipe at the exhaust valve may be designed to be a variable cross-section nozzle (professionally referred to as Laval nozzle or tapering and expanding nozzle) as shown in FIG. 2, so that the gas in the surge tank enters the cylinder along the wall surface of the cylinder at a supersonic velocity, thereby further improving the swirl ratio in the cylinder. Or, the pipe at the exhaust valve is designed to be a constant-section pipe structure, and meanwhile, the gas in the surge tank enters the cylinder along the wall surface of the cylinder at a local sound velocity.

Figure 3:
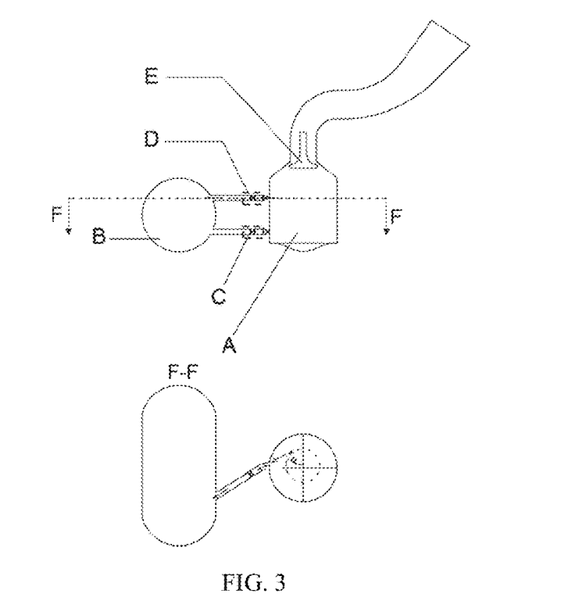
FIG. 3 is a schematic diagram of an intake stage of the cylinder gas recirculation system.

During the CGR intake stage: as shown in FIG. 3, during the stage when the compression stroke of cylinder A is close to the end, the pressure in the cylinder is higher than the pressure in the surge tank B, and the CGR exhaust valve C is closed. By opening the CGR intake valve D, the gas in the cylinder flows towards the surge tank, and when the mass of the gas flowing out of the surge tank during the intake stage and the mass of the gas flowing into (the surge tank) during the exhaust stage is kept constant, the CGR intake valve D is closed. Thus, the cylinder gas recirculation system realizes in-cylinder gas circulation between different cylinders (including the surge tank) through the CGR intake and exhaust stage.

In addition, in the intake stage of the CGR system, the gas entering the surge tank may not only come from the in-cylinder high-pressure gas near the end of the compression stroke but also utilize the in-cylinder high-temperature and high-pressure gas generated during the combustion and power stroke of the engine. According to the differences in the exhaust time, the exhaust gas of the cylinder gas recirculation has the following two technical solutions.

Technical solution 1: the gas in the cylinder is discharged to the surge tank in the compression stage of the internal combustion engine.

Technical solution 2: the gas in the cylinder is discharged to the surge tank in the combustion and expansion stroke of the internal combustion engine. Because the gas temperature in the combustion and expansion stroke is relatively high, during the CGR intake stage, the high-temperature gas in the surge tank can, on the one hand, increase the in-cylinder swirl ratio. On the other hand, on the premise of not affecting the scavenging efficiency, the in-cylinder temperature can be greatly increased, satisfying the requirements of a new combustion mode such as HCCI and PCCI. Conventional methods generally use intake air heating to increase the temperature of the in-cylinder working medium, but would greatly reduce the scavenging efficiency.

The characteristics and beneficial effects of the present disclosure are as follows: 1) the in-cylinder high-temperature and high-pressure gas generated during the combustion/expansion stroke enters a recirculation surge tank through the CGR intake passage and then enters the cylinder through the CGR exhaust passage. Under the guidance of the wall surface of the cylinder, the kinetic energy carried by itself can significantly increase the in-cylinder swirl ratio, to promote the oil-gas mixing and accelerate the combustion rate. 2) For a multi-cylinder internal combustion engine, all cylinders can share the same surge tank to achieve gas recirculation between different cylinders. 3) There is no need to greatly change the structure of the cylinder block of the internal combustion engine, through the recirculation of the gas in different cylinders, the in-cylinder swirl flow is significantly increased, the mixing of oil and gas is promoted, and the combustion effect is improved.

DETAILED DESCRIPTION OF THE EMBODIMENTS

The system composition as well as the structural device of the present disclosure are further described below in combination with the accompanying drawings and through specific embodiments. The described embodiments are narrative and are intended to clearly explain the idea of the present disclosure, but should not be construed as a limitation of the technical features of the present disclosure.

Figure 4:
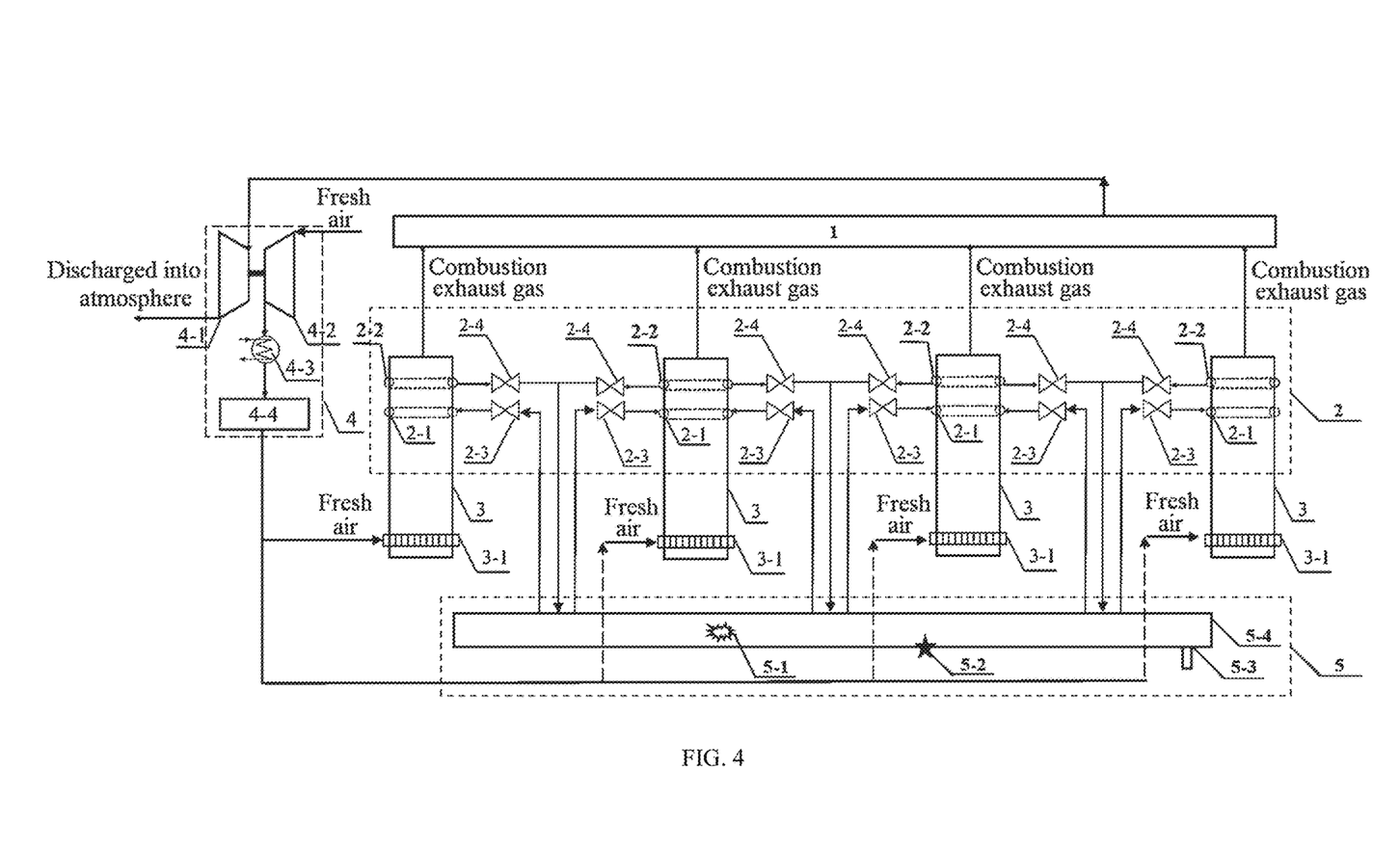
FIG. 4 is a structural system diagram of a cylinder gas recirculation system of a four-cylinder internal combustion engine.

Regarding FIG. 1 to FIG. 10, the cylinder gas recirculation system device of an internal combustion engine based on pressure differential driving is provided. As shown in FIG. 4, the system composition, as well as the structure of the device, is as follows: the gas recirculation device includes two parts: a CGR passage system 2 and a CGR gas storage system 5. The CGR intake valve 2-2 on the cylinder block 3, the CGR intake control valve 2-4, the CGR surge tank 5-4, the CGR exhaust control valve 2-3, and the CGR exhaust valve 2-1 on the cylinder block are sequentially connected to form the gas recirculation subsystem. The CGR intake control valve is in communication with the CGR surge tank to serve as an intake passage; the CGR surge tank is in communication with the CGR exhaust control valve to serve as an exhaust passage. Two adjacent cylinder gas recirculation subsystems are in communication via a CGR intake pipe. The surge tank is provided with the glow plug 5-1, the pressure sensor 5-2, and the gas outlet valve 5-3 to form the CGR gas storage system 5. The exhaust gas generated by the combustion process of the engine enters the turbine 4-1 via the exhaust port 1 and is finally discharged into the atmosphere; fresh air firstly enters the gas compressor 4-2 and enters a scavenging box 4-4 after being cooled by a condenser 4-3, and an outlet of the scavenging box is connected to a scavenging port 3-1 in the cylinder block, thereby delivering the fresh air to the cylinder.

An internal combustion engine with a four-cylinder structure includes four gas recirculation subsystems, and the four gas recirculation subsystems are connected in pairs; an internal combustion engine with a six-cylinder structure comprises six gas recirculation subsystems, and the six gas recirculation subsystems are connected in pairs; and so on.

The following are included as important technical features of the present disclosure.

The intake air of the CGR is drawn from the engine during the compression stroke or from the engine during the combustion stroke. Depending on the timing of the CGR intake, it can be divided into two intake passages: the intake from the compression stroke and the intake from the combustion stroke (a detailed description is as follows).

The pipe at the CGR exhaust valve is designed as a Laval nozzle structure, so that the velocity of the fluid at the outlet of the pipeline (at the interface with the valve inlet) may reach the supersonic velocity (the critical pressure ratio of air is less than 0.528), i.e., the gas in the CGR surge tank enters the cylinder along the wall surface of the cylinder at the supersonic velocity. Also, the pipe at the exhaust valve may be designed to be a pipe structure with a constant section, at this time, it is necessary to maintain the ratio of pressure of the gas in the cylinder to the pressure in the surge tank to be 0.528, the gas in the CGR surge tank may enter the cylinder at the local sound velocity along the wall surface of the cylinder.

The CGR intake and exhaust valves are positioned between the top dead center (TDC) and bottom dead center (BDC) of the piston, and the cylinder gas recirculation shares the same valve and pipeline to realize the CGR intake and exhaust process. Or, use different CGR intake valves, CGR exhaust valves, and corresponding piping to realize the CGR intake and exhaust process respectively.

The angle between the CGR intake and exhaust pipelines is selected in the range of 40° to 60°, such as the angle α shown in the F-F cross-section view in FIG. 3 (or α in FIG. 8 and FIG. 10), and the recirculating gas enters the cylinder under the guidance of the cylinder wall surface, which effectively increases the in-cylinder swirl ratio.

As an improvement of the technical features of the present disclosure, the interior and exterior of the CGR surge tank are coated with an insulating material to prevent wall heat transfer from the tank to the environment.

The glow plug is used for heating the gas in the CGR surge tank and controlling the temperature of the gas. The glow plug is mainly used to compensate for the temperature of the surge tank, adjust the pressure in the recirculating surge tank with the pressure sensor, and precisely control the time and quality of the recirculation in cooperation with the intake and exhaust valves.

The gas in the CGR surge tank is discharged through the gas outlet valve and is used to adjust the pressure in the CGR surge tank.

The outlet of the exhaust port is connected to the inlet of the turbine, the turbine is coaxially connected to the gas compressor and the outlet of the gas compressor is connected to the condenser, the condenser is connected to the scavenging box, and the outlet of the scavenging box is connected to the scavenging port, the exhaust gas from the rear end of the turbine is discharged into the atmosphere. Fresh air from the scavenging box enters through the lower scavenging port of the cylinder.

The recirculating gas is divided into two intake passages depending on the timing of the CGR intake: enters the cylinder during the compression stroke and enters the cylinder during the combustion stroke, which takes the four-cylinder internal combustion engine as an example.

Figure 5:
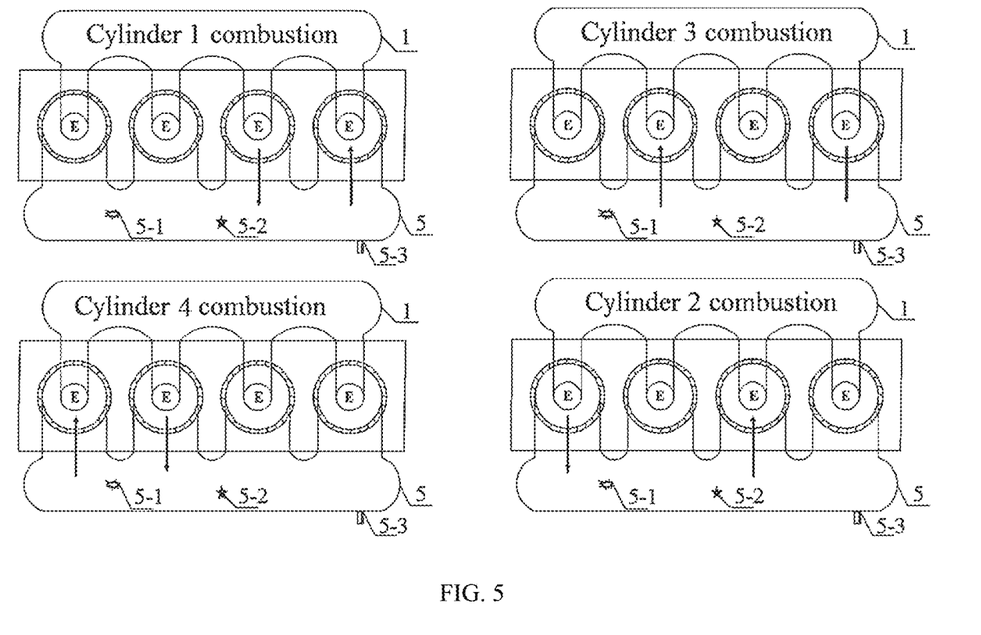
FIG. 5 is a schematic diagram of a cylinder gas recirculation working process with CGR exhaust in the compression stroke of the four-cylinder internal combustion engine.

The working process (as shown in FIG. 5) of the CGR intake from the compression stroke of the engine (cylinder ignition sequence is 1-3-4-2):

When the first cylinder is in the combustion stroke, the second cylinder is at the end stage of combustion, the third cylinder is at the end stage of compression, and the fourth cylinder is at the early stage of compression. At this time, the gas is led out by the third cylinder through the CGR intake passage and then enters the CGR surge tank to provide the CGR intake source for the subsequent recirculation. The gas in the tank passes the CGR exhaust passage via the exhaust pipeline and directly enters the fourth cylinder to increase the in-cylinder swirl ratio and participates in the subsequent oil-gas mixing and combustion process.

When the third cylinder is in the combustion stroke, the first cylinder is at the end stage of combustion, the second cylinder is at the early stage of compression, and the fourth cylinder is at the end stage of compression. At this time, the gas is led out by the fourth cylinder through the CGR intake passage and then enters the CGR surge tank to provide the CGR intake source for the subsequent recirculation. The gas in the tank passes the CGR exhaust passage via the exhaust pipeline and directly enters the second cylinder and participates in the subsequent oil-gas mixing and combustion process.

When the fourth cylinder is in the combustion stroke, the first cylinder is at the early stage of compression, the second cylinder is at the end stage of compression and the third cylinder is in the end stage of combustion. At this time, the gas is led out by the second cylinder through the CGR intake passage and then enters the CGR surge tank to provide the CGR intake source for the subsequent recirculation. The gas in the tank passes the CGR exhaust passage via the exhaust pipeline enters the first cylinder, and participates in the subsequent oil-gas mixing and combustion process.

When the second cylinder is in the combustion stage, the first cylinder is at the end stage of compression, the third cylinder is at the early stage of compression, and the fourth cylinder is at the end stage of combustion. At this time, the gas is led out by the first cylinder through the CGR intake passage and then enters the CGR surge tank to provide the CGR intake source for the subsequent recirculation. The gas in the tank passes the CGR exhaust passage via the exhaust pipeline enters the third cylinder, and participates in the subsequent oil-gas mixing and combustion process.

Figure 6:
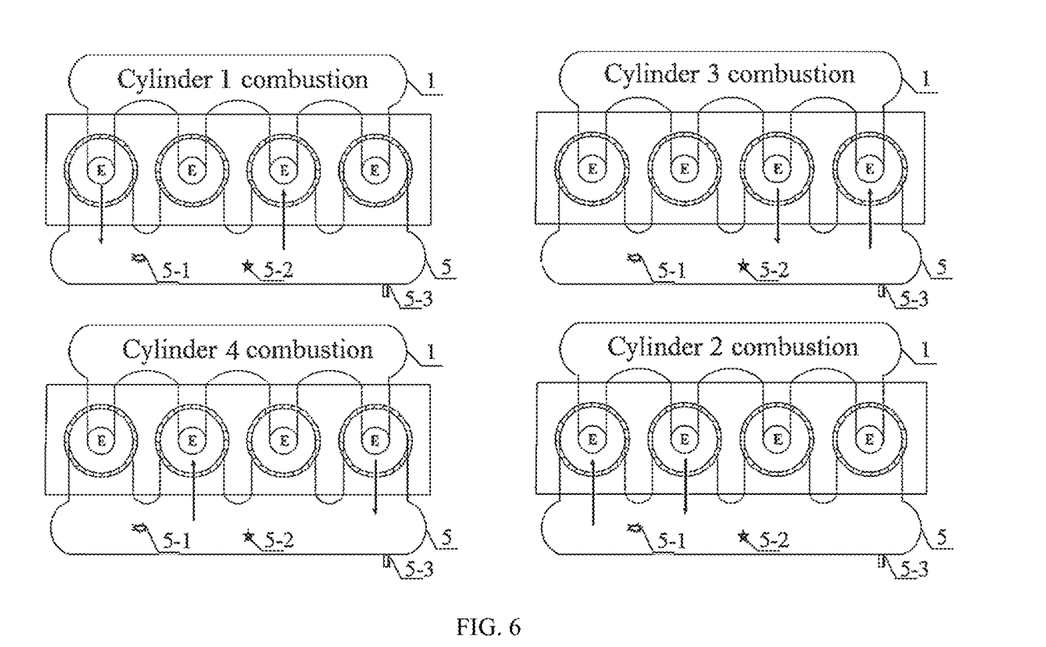
FIG. 6 is a schematic diagram of a cylinder gas recirculation working process with CGR exhaust in a combustion stroke of the four-cylinder internal combustion engine.

The working process (as shown in FIG. 6) of the CGR intake from the combustion stroke of the engine (cylinder ignition sequence is 1-3-4-2):

When the first cylinder is in the combustion stroke, the second cylinder is at the end stage of combustion, the third cylinder is at the end stage of compression, and the fourth cylinder is at the early stage of compression. At this time, the gas is led out by the first cylinder or the second cylinder through the CGR intake passage and then enters the CGR surge tank to provide the CGR intake source for subsequent recirculation. The gas in the tank enters the fourth cylinder through the CGR exhaust passage and participates in the subsequent oil-gas mixing and combustion process.

When the third cylinder is in the combustion stroke, the first cylinder is at the end stage of combustion, the second cylinder is at the early stage of compression, and the fourth cylinder is at the end stage of compression. At this time, the gas is led out by the third cylinder or the first cylinder through the CGR intake passage and then enters the CGR surge tank to provide the CGR intake source for subsequent recirculation. The gas in the tank enters the second cylinder through the CGR exhaust passage and participates in the subsequent oil-gas mixing and combustion process.

When the fourth cylinder is in the combustion stroke, the first cylinder is at the early stage of compression, the second cylinder is at the end stage of compression and the third cylinder is at the end stage of combustion. At this time, the gas is led out by the fourth cylinder or the third cylinder through the CGR intake passage and then enters the CGR surge tank to provide the CGR intake source for subsequent recirculation. The gas in the tank enters the first cylinder through the CGR exhaust passage and participates in the subsequent oil-gas mixing and combustion process.

When the second cylinder is in the combustion stage, the first cylinder is at the end stage of compression, the third cylinder is at the early stage of compression, and the fourth cylinder is at the end stage of combustion. At this time, the gas is led out by the second cylinder or the fourth cylinder through the CGR intake passage and then enters the CGR surge tank to provide the CGR intake source for subsequent recirculation. The gas in the tank enters the third cylinder through the CGR exhaust passage and participates in the subsequent oil-gas mixing and combustion process.

Figure 9:
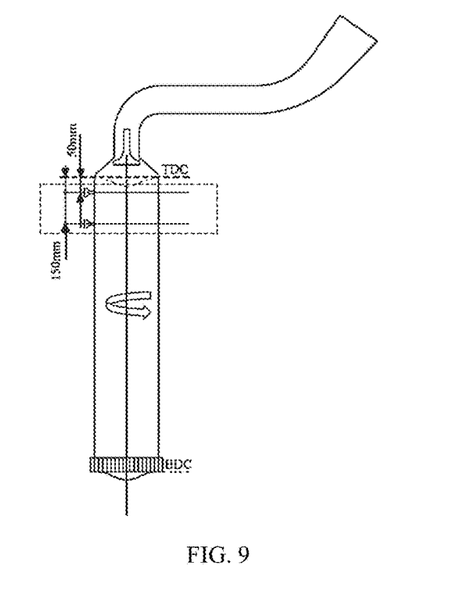
FIG. 9 is a schematic diagram of the structure and installation position of a double-layer arrangement of the intake and exhaust pipelines of the cylinder gas recirculation system.
Figure 10:
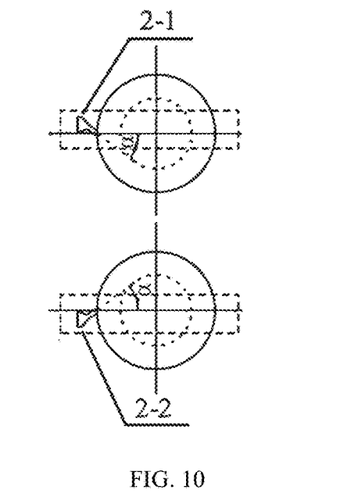
FIG. 10 is a schematic diagram showing that different valves are used for the CGR intake and exhaust process, the double-layer intake and exhaust pipelines of the gas recirculation are arranged at the same side of the cylinder, and an upper part is the exhaust valve and a lower part is the intake valve.

The positions of the aforementioned CGR intake and exhaust passages may be selected between the top dead center (TDC) and bottom dead center (BDC) of the piston, and the intake and exhaust passages may be used to realize the CGR intake process and the CGR exhaust process, respectively, as shown in FIGS. 9 and 10. In FIG. 9, the position of the intake pipeline is 50 mm away from the compression top dead center (TDC); the position of the exhaust pipeline is 150 mm away from the compression top dead center (TDC).

Figure 7:
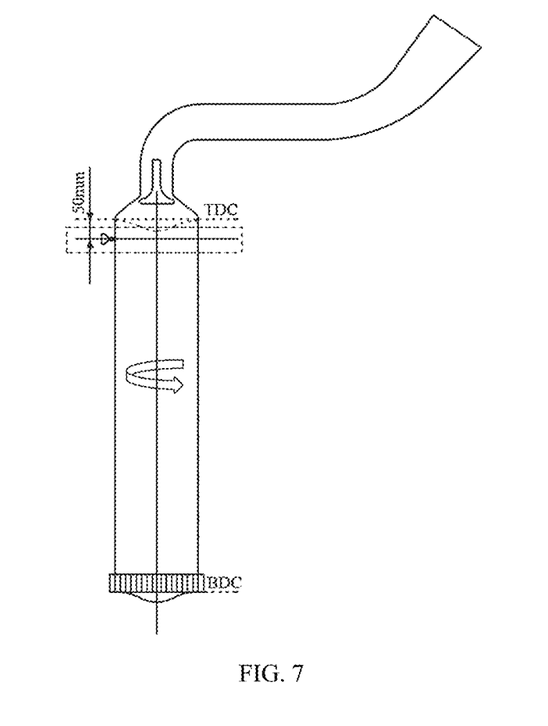
FIG. 7 is a schematic diagram of the structure and installation position of a single-layer arrangement of intake and exhaust pipelines of the cylinder gas recirculation system of the internal combustion engine.
Figure 8:
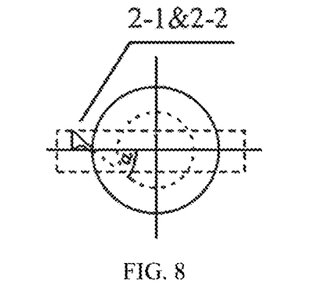
FIG. 8 is a schematic diagram showing that intake and exhaust share the same valve, with the intake and exhaust piping of the cylinder gas recirculation system arranged in a single layer and a quantity of one.

To simplify the device structure of the intake and exhaust pipelines, the same pipeline may also be used to realize the intake stage and CGR exhaust stage through the same valve control, as shown in FIG. 7 and FIG. 8. The position of the intake pipeline is 50 mm away from the compression top dead center (TDC).

Embodiment 1

This embodiment is based on a low-speed two-stroke marine diesel engine with a cylinder bore of 340 mm, a rotational speed of 142.6 r/min (75% load), and a piston stroke length of 1600 mm. Exhaust gas enters the turbine-driven power system. The amount of CGR recirculated gas accounts for 4% of the total working medium in the cylinder after the exhaust valve is closed. And key parameters of the recirculated gas and the in-cylinder working medium are listed in Table 1 and Table 2.

TABLE 1

Key parameters of recirculated gas

| | Pressure | Temperature | Open time of CGR exhaust valve | CGR exhaust duration | Open time of CGR intake valve | CGR intake duration |
|---|---|---|---|---|---|---|
| Recirculation pressure stabilizing tube | 5.7 MPa | 700K | 320° C.A | 6° C.A | 340° C.A | 5.45° C.A |

TABLE 2

In-cylinder temperature and pressure during recirculation

| Time | 320°CA | 326°CA | 340°CA | 345.45°CA |
|---|---|---|---|---|
| Pressure | 1.964 MPa | 2.811 MPa | 6.393 MPa | 8.442 MPa |
| Temperature | 533.61 K | 589.46 K | 738.08 K | 795.76 K |

During the compression stroke (intake valve opens from 340° C.A to 345.45° C.A), the CGR gas is introduced from the CGR intake pipeline into the CGR intake passage and finally into the CGR storage system. The recirculating gas from the CGR storage system is then introduced through the CGR exhaust valve via the CGR exhaust passage, and directly into the cylinder (exhaust valve opens from 320° C.A to 326° C.A). The flow rate is about 500 m/s, and the temperature of the recirculating gas is 700 K. The intake and exhaust valves use different valves, and the intake and exhaust pipelines are arranged on the same side of the cylinder in double layers, with the angle $\alpha$ of the intake and exhaust pipelines being 55°, and the intake pipeline is at a distance of 50 mm from the compression top dead center (TDC); and the exhaust pipeline is at a distance of 150 mm from the compression top dead center (TDC) (e.g., FIGS. 9 and 10).

Compared with the same type of diesel engine without CGR technology, the recirculating gas enters the cylinder under the guidance of the wall surface of the cylinder, effectively increasing the in-cylinder swirl ratio, and the swirl ratio at the compression top dead center (TDC) is increased from 5.2 to 12.1, with an increase of 132%. The increase of the swirl ratio substantially increases the oil-gas mixing rate as well as the combustion rate, the burst pressure is increased by 8.01%, the combustion duration is shortened by 51.96%, and the combustion duration is shortened by 51.96%. Ultimately, the power is increased by 4.84% and the fuel consumption is reduced by 8.3 g/kW·h (for a container ship of 10,000 TEU level, the fuel cost may be saved about 12 million RMB per year).

Embodiment 2

This embodiment adopts a natural gas/diesel dual-fuel, low-pressure mode, low-speed two-stroke marine engine with a cylinder diameter of 500 mm, a rotational speed of 102 r/min (75% load), and a piston stroke length of 2050 mm. The natural gas is injected at a rate of 22.1 g per cycle, and the diesel fuel is primed at a rate of 0.227 g. The amount of CGR gas recirculating is 5% of the total amount of in-cylinder working medium after the exhaust valve is closed.

During the combustion stroke (390° C.A to 394.5° C.A), the CGR gas is introduced into the CGR intake passage system by the CGR intake valve and finally into the CGR storage system. Subsequently, the recirculating gas in the CGR storage system is introduced into the cylinder (320° C.A to 326° C.A) through the CGR exhaust passage via the CGR exhaust valve at a flow rate of about 700 m/s, and the temperature of the recirculating gas is 1060 K. Different valves are used for the intake and exhaust valves, and the intake and exhaust pipelines are arranged on the same side of the cylinder in double layers, with an angle of a between the intake and exhaust pipelines of 55°. The position of the exhaust valve is at a distance of 200 mm from the compression top dead center (TDC), and the position of the intake valve is at a distance of 150 mm from the compression top dead center (TDC).

Compared with the internal combustion engine without CGR technology, the recirculating gas enters the cylinder under the guidance of the wall surface of the cylinder, which effectively increases the in-cylinder swirl ratio, and the swirl ratio at the compression top dead center (TDC) is increased from 5.2 to 16. In addition, the temperature at the compression top dead center (TDC) is increased from 800 to 950 K, which enables the realization of the natural gas HCCI combustion mode without the need for diesel pilot ignition.

The invention claimed is:

1. A cylinder gas recirculation system device of an internal combustion engine based on pressure differential driving, comprising: a cylinder block of the internal combustion engine, a cylinder, a CGR intake valve, a CGR exhaust valve, a CGR intake control valve, a CGR exhaust control valve, a CGR surge tank, an exhaust port, a turbine, a gas compressor, a scavenging box, a glow plug, a pressure sensor and a gas outlet valve, wherein a gas recirculation device comprises two parts: a CGR passage system and a CGR gas storage system;
 wherein the CGR intake valve, the CGR intake control valve, the CGR surge tank, the CGR exhaust control valve, and the CGR exhaust valve are sequentially connected to form a gas recirculation subsystem;
 wherein the CGR intake control valve is in communication with the CGR surge tank to serve as an intake passage in the CGR passage system, and the CGR surge tank is in communication with the CGR exhaust control valve to serve as an exhaust passage in the CGR passage system;
 wherein two adjacent gas recirculation subsystems are in communication via a CGR intake pipe; an internal combustion engine with a four-cylinder structure comprises four gas recirculation subsystems connected in pairs; and an internal combustion engine with a six-cylinder structure comprises six gas recirculation subsystems connected in pairs, and so on;
 wherein the surge tank is provided with the glow plug, the pressure sensor, and the gas outlet valve to form the CGR gas storage system; and
 wherein exhaust gas generated by the combustion of the engine enters the turbine via the exhaust port and is finally discharged into the atmosphere; fresh air firstly enters the gas compressor, and enters the scavenging box after being cooled by a condenser; and an outlet of the scavenging box is connected to a scavenging port in the cylinder block of the internal combustion engine, thereby delivering the fresh air to the cylinder.

2. The cylinder gas recirculation system device of an internal combustion engine based on pressure differential driving according to claim 1, wherein intake air of the CGR is drawn from the engine during a compression stroke, or from the engine during a combustion stroke.

3. The cylinder gas recirculation system device of an internal combustion engine based on pressure differential driving according to claim 1, wherein a pipe at the CGR exhaust valve is designed to be a Laval nozzle structure, and the CGR gas in the CGR surge tank enters the cylinder along a wall surface of the cylinder at a supersonic velocity; or the pipe at the exhaust valve is designed to be a constant-section pipe structure, and the CGR gas in the CGR surge tank enters the cylinder along the wall surface of the cylinder at a local sound velocity.

4. The cylinder gas recirculation system device of an internal combustion engine based on pressure differential driving according to claim 1, wherein positions of the CGR intake and exhaust valves are selected to be between a top dead center and a bottom dead center of a piston, and a cylinder gas recirculation system shares a same valve and pipeline to realize CGR intake and exhaust recirculation process; or, different CGR intake valves, CGR exhaust valves and corresponding piping are used to respectively realize the CGR intake and exhaust recirculation.

5. The cylinder gas recirculation system device of an internal combustion engine based on pressure differential driving according to claim 1, wherein an angle between CGR intake and exhaust pipelines is selected in a range of 40° to 60°.

6. The cylinder gas recirculation system device of an internal combustion engine based on pressure differential driving according to claim 1, wherein the interior and exterior of the CGR surge tank are coated with an insulating material to prevent wall heat transfer from the tank to the environment.

7. The cylinder gas recirculation system device of an internal combustion engine based on pressure differential driving according to claim 1, wherein the glow plug is used for heating the CGR gas and controlling the temperature of the gas in the CGR surge tank.

8. The cylinder gas recirculation system device of an internal combustion engine based on pressure differential driving according to claim 1, wherein gas in the CGR surge tank is discharged through the gas outlet valve, and used for adjusting the pressure in the CGR surge tank.

* * * * *